United States Patent [19]

Moore

[11] Patent Number: 4,587,378
[45] Date of Patent: May 6, 1986

[54] TWO-LAYER TOUCH TABLET

[75] Inventor: Cecil A. Moore, San Jose, Calif.

[73] Assignee: Koala Technologies Corporation, San Jose, Calif.

[21] Appl. No.: 636,059

[22] Filed: Jul. 30, 1984

[51] Int. Cl.$^4$ ............................................. G08C 21/00
[52] U.S. Cl. .................................................... 178/18
[58] Field of Search ............................ 178/18, 19, 20;
340/712, 365 UL, 365 C

[56] References Cited

U.S. PATENT DOCUMENTS 3,207,905  9/1965  Bray ............................... 340/712 X
4,484,026  11/1984  Thornburg ........................... 178/18

Primary Examiner—Stafford D. Schreyer
Attorney, Agent, or Firm—Thomas S. MacDonald; Alan H. MacPherson; Steven F. Caserza

[57] ABSTRACT

A touch tablet (10) for determination of x-axis and y-axis coordinates of point touched includes a two-layer operating structure, each layer (11,21) containing a resistive bar (12,22) at an edge portion of an insulative substrate and a series of interdigitated conductive pathways (14,15) extending toward and away from the bar and an opposed conductive strip (13,33,43) on at least one of the layers. The bars and conductive pathways are orthogonally with respect to one another on each layer and further are orthogonal on one layer with respect to those bars and pathways on the other layer. A potential typically of 5 V is impressed on either one end of each of the resistive bars or on the interdigitated pathways.

The two layers (11,21 or 31,41) are normally spaced from each other by insulative dots (6) on one facing surface or by an embossed peripheral ridge (56) on the top surface. Pressing of a point or small area of the top layer by a user's finger or hand-operated stylus makes a contact between the respective conductive pathways and simultaneously outputs an x-axis and y-axis coordinate voltage variously dependent on the point pressed and the resistance of the linear length of the bar from the point of connection of the voltage to the bar and the intersection of contacted orthogonal pathways. The resultant 0–5 V output may be picked-off in either a potentiometric or rheostatic mode and conducted to a CRT or computer port for processing and display.

7 Claims, 6 Drawing Figures

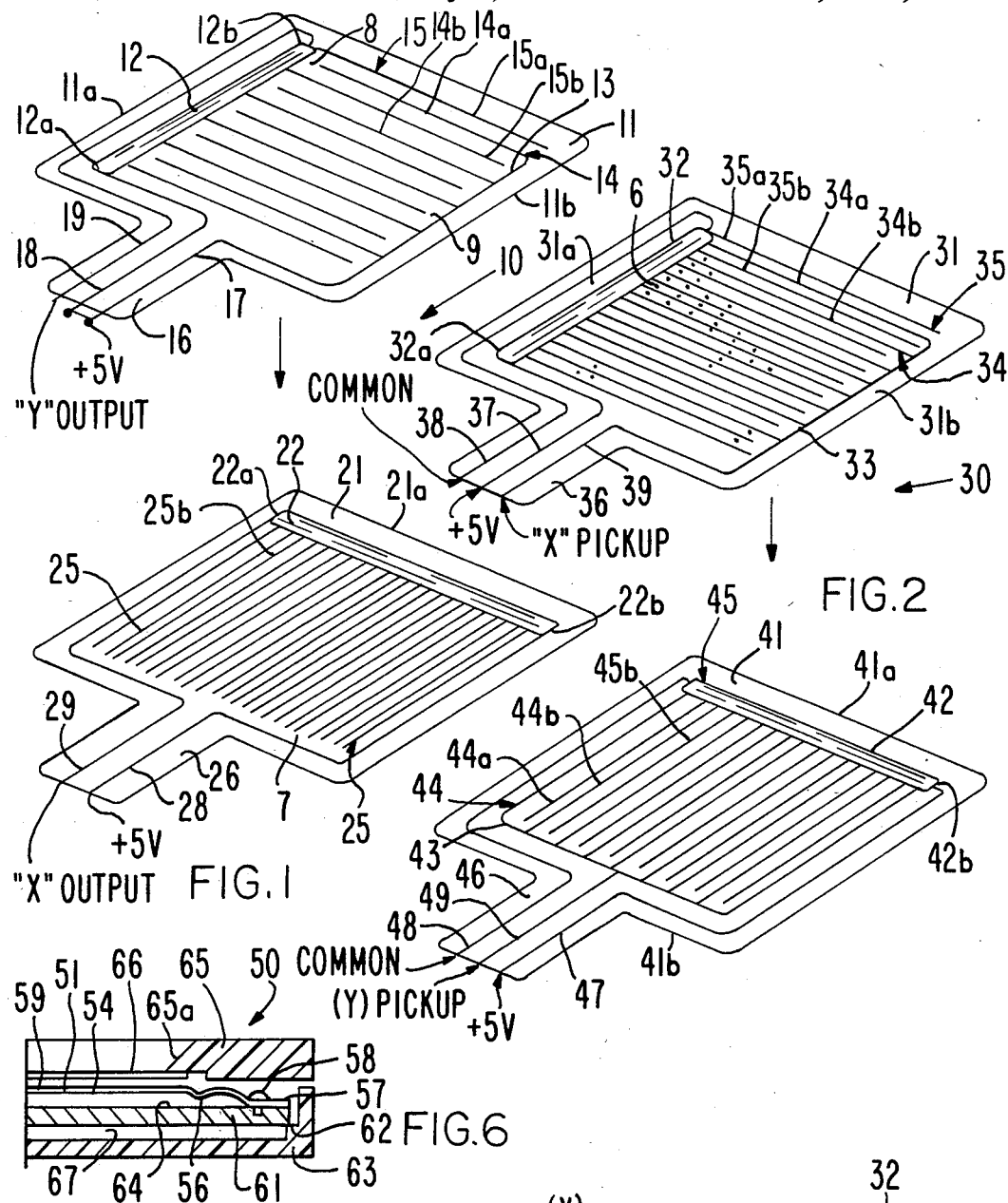
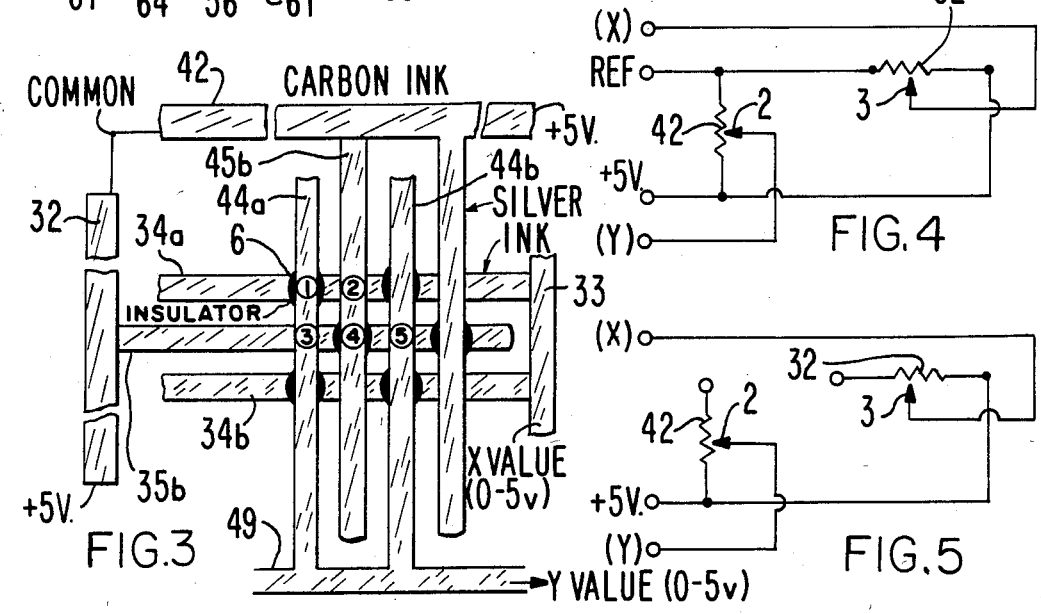

TWO-LAYER TOUCH TABLET

CROSS-REFERENCE TO RELATED APPLICATION

This application is an improvement to those co-pending U.S. patent applications Ser. Nos. 06/475,418, now U.S. Pat. No. 4,484,026 and 06/475,419 both filed 3/15/83, entitled Touch Tablet Data Device and Simplified Touch Tablet Data Device, Inventors: Thornburg and Thornburg and White. This application may also utilize any of the peripheral edge embossments shown in my application Ser. No. 06/635,381 entitled "Edge Separated Touch Tablet" with coinventor Gordon B. Langford filed concurrently with this application and the subject matter of such concurrently filed application is hereby incorporated herein by reference. Each of the above applications have common ownership.

BACKGROUND OF THE INVENTION

1. Field of the Invention

This invention relates to an analog touch tablet for the outputting of data to a computer or other graphics display device which translates a particular position or area touched on the tablet to the x-y axis coordinates of the position pressed by a user's finger or stylus. More particularly it is directed to a simpler non-electronic passive touch tablet capable of being manufactured at appreciably less expense.

2. Description of the Prior Art

Various U.S. patents show resistance measuring devices for determining x-y coordinates of a touch point. Several of these are listed and discussed in the related applications filed 3/15/83. U.S. Pat. No. 3,207,905 broadly shows the use of interdigitated conductive pathways in touch-sensitive keyboards where a human body impedance completes the circuit switch. U.S. Pat. No. 3,959,585 is illustrative of a resistance coated pair of spaced sheets in a stylus-operated tablet which outputs x- and y-axis coordinate readings. In general these prior art devices utilize a voltage potential and multiplexing techniques where first the x-axis reading and then the y-axis reading is obtained. This necessitates relatively expensive and complex electronic circuitry to effect such functions, including normally an analog-to-digital converter. Related application Ser. Nos. 06/475,418 and 06/475,419 disclose a three-layer tablet which has simultaneous x-axis and y-axis outputs. U.S. Pat. No. 4,444,998 also shows simultaneous outputs.

SUMMARY

The present invention is directed to a passive, i.e. no electronic components, touch tablet wherein a fixed voltage potential is impressed on at least one end of a pair of resistance bars, each on one edge of two facing insulative layers. Each layer contains a series of conductive orthogonal conductive spaced pathways facing each other and extending from the bars, with at least one of the series having interdigitated conductive lines. The layers are normally spaced from each other but when pressed by a user's finger or stylus force are brought into contact. At that time simultaneous voltages are picked-off in a potentiometric mode or rheostatic mode to indicate the x-axis and y-axis coordinates of the point or area pressed.

In one embodiment both layers include interdigitated pathways orthogonally displaced each other on facing surfaces. At least one of the facing surfaces includes insulative embossments means or dots normally spacing the layers apart. When a particular location on a layer is pressed the two surfaces come into contact between surrounding dots. This acts further to prevent short circuiting between intersections of the orthogonally disposed conductive pathways surrounding the location pressed. In a preferred embodiment no insulative dots are included. An embossed peripheral edge as seen in the co-filed application, is provided on one of the layers which acts to normally space the layers. Upon one of the layers being pressed the embossed edge allows movement of one layer toward the other and upon release of the pressing force the stored energy in a hinge-like embossed edge returns the layers to their normal spaced position. No separation dots means no sudden loss of contact over a dot. The embossed edge and dots allow for the tracing of a series of line contacts on the layers so that a continuous line or drawing can be impressed on the tablet and, in turn, to a data viewing screen.

BRIEF DESCRIPTION OF THE DRAWINGS

FIG. 1 is an exploded schematic perspective view of a preferred embodiment of the two layer tablet.

FIG. 2 is an exploded schematic perspective view of another embodiment of the tablet.

FIG. 3 is a detailed top view of a portion of the tablet surface showing the intersection of interdigitated lines in the assembled FIG. 2 version.

FIG. 4 is the equivalent electrical circuit of the tablets of FIGS. 1 and 2.

FIG. 5 is an alternative equivalent electrical circuit for connection to computers with paddle port inputs.

FIG. 6 is a one-half side cross-sectional view of a complete touch tablet.

DETAILED DESCRIPTION

The preferred form of the invention is seen schematically in FIG. 1. The tablet 10 comprises a rectangular top insulative layer 11 having a resistive coated bar 12 adjacent a first edge 11a of layer 11. Oppositely disposed from bar 12 is a parallel conductive pathway 13 adjacent the opposed edge 11b of the layer 11. A series of interdigitated pathways are alternately connected to resistive bar 12 and parallel pathway strip 13. These are shown as conductive pathways 14a, 14b, etc. connected to strip 13 and pathways 15a, 15b, etc. connected resistive bar 12. Resistive bar 12 is normally made out of standard carbon ink having a ohmic resistance of from 100K to 500K per bar. Conductive pathways 13 and the interdigitated pathways 14 and 15 may be made from silver ink or may be conductive lines resultant from a masking and etching step on an insulated substrate which has been coated with a conductive material. Layer 11 is of insulative material such as Mylar polyester of approximately 3 to 10 mils in thickness and is generally flexible. Extending from layer 11 is a connecting insulative tail 16 containing a conductive pathway 17 for imposing a +5 volt potential on pathway 13 and the interdigitated legs 14a, 14b, etc. extending from such pathway 13. A conductive pathway 18 also extends from tail 16 and is connected to an end 12a of resistive bar 12. Paths 17 and 18 are connected together and to +5 V. Lastly, a conductive path 19 extends from end 12b of resistive bar 12 to a y output connection on the tail 16.

The second layer 21 of the two-layer tablet for determination of the x-axis coordinate of the point touched contains a similar resistive bar 22 orthogonally located on the end 21a of layer 21. Layer 21 generally is of rigid insulative material such as polyvinyl chloride as used in printed circuit boards on which the bar 22 is coated. Extending from bar 22 are a series of spaced parallel conductive pathways 25a, 25b, etc. collectively indicated by numeral 25 extending over the length of resistive bar 22. A double density of conductive pathways 25a, 25b, etc. are possible in the x-axis direction over those pathways shown on layer 11. This gives improved resolution on a cathode ray terminal or other type of video screen. Resolution on the horizontal lines in a CRT is greater than in the vertical direction thus the design shown in FIG. 1 is more adaptable to such a video terminal. In the case of an IBM PC computer there are 620 dots across and 240 dots down on the screen. In the nondigitated layer 21 a reference potential (5+v) is connected by pathway 28 from tail 26 to end 22b of the resistance bar 22. Output from the other end 22a of the resistance bar is connected along pathway 29 to an x-axis output. Each of the interdigitated multiple pathways 14 and 15 in the upper layer 11 extend across the layer to a position adjacent to their opposed resistance bar or parallel conductive pathway, respectively, so that a gap 8 or gap 9 is left between the free ends of the interdigitated pathways and the bar or conductive pathway to which it approaches. Each of the parallel pathways 25a, 25b, etc. in layer 21 extend across the layer towards the tail 26 but terminate in a free end leaving a gap 7 between those free ends and the connecting pathways 28 and 29 leading to the opposite ends of resistive bar 22.

In operation the layers are in parallelism and spaced apart approximately 50-60 mils. Typically a 5 volt potential is supplied to the conductive pathways 17, 13 and 14. When a point is pressed anywhere in an area of the interdigitated lines 14, 15 and the orthogonally oriented parallel lines 25a, 25b, etc. contact is made at that location of the layers 11 and 21. Layers 11 and 21 are normally spaced by either insulative dots 6 shown in the embodiment of FIG. 2 or by a peripheral hinge 56 shown in the preferred tablet embodiment in FIG. 6.

Nominally the y-axis output pathways from sheet 11 will have a spacing of approximately 50 lines per inch i.e. 25 lines per inch of pathways 14 and 25 lines per inch of pathways 15, while the double density lines 25 of layer 22 will have approximately 50 lines per inch. Only every other of pathways 14, 15 are utilized in the y-output. The resolution of the conductive pathways may be increased by increasing the x-axis pathways 25 to 100 lines per inch and the y-axis pathways 14, 15 to 50 lines per inch. Likewise, the resolution may be decreased to 2-4 lines per inch if it is desired to utilize the invention for keyboard applications. In the device shown in FIG. 1 the x-axis lines and y-axis lines have a common +5 volts i.e. pathways 25 receive +5 volts from pathways 14 when they touch. It is not necessary to ground the opposite ends of the conductive bars. These may be connected to a reference potential or common reference point or to ground as desired. Before the tablet is pressed by a finger or stylus force the +5 volts is isolated from the x and y outputs since there is no connection or contact between the layers 11 and 21. When contact is made, which is generally a point or area contact by one of the y-pathways 14 bridging across some of the x pathways 25, the x pathways 25 short the +5 volts to one or more of the pathways 25. At the same time certain pathways 15 are bridged which lead in turn to the resistance bar 12 at a particular position along the linear length of that bar. Since the resistance of the bar is constant along each increment of the bar, the voltage is distributed along the bar in a rheostatic mode so that a resistance output is the y-axis reading from pathway 19, representative of the linear distance (and voltage drop) from the end 12b of the bar to the intersection with bar 12 of a particular interdigitated pathway 15a, 15b or other pathway 15 which is bridged by the movement of the two layers into contact by the touching force. Likewise, the x-axis pick-up represents the distance along bar 22 from a location of intersection with that parallel conductive path 25a, 25b, or other pathway 25 brought into bridging contact by the user's finger or stylus. This also represents a resistance along the resistive bar 22 from end 22a to end 22b which outputs as an x-axis output from pathway 29.

FIG. 2 is a modification of the touch tablet of FIG. 1 wherein the upper layer 31 and lower layer 41 are interdigitated in the same manner as layer 11 in FIG. 1. Thus, layer 31 has a resistive bar 32, interdigitated conductive pathways 34 and 35 extending toward the bar or extending toward a conductive pathway strip 33 parallel to the resistive bar, respectively. Layer 41 has a resistive bar 42 and interdigitated pathways 44, 45 and pathway strip 43 each orthogonally located with those on layer 31. In FIG. 2 a 5 volt potential is applied to bar end 32a and end 42b of bars 32 and 42 respectively and measurement of a pressed point is made in the potentiometric mode. A common connection 38 and 48 on layers 31 and 41 may be staked together on the tails 36 and 46, which on assembly are superimposed insulatively one above the other.

It is to be understood that in FIGS. 1 and 2 the resistive bars and conductive pathways are on the underside of layers 11 and 31 and the resistive bar and conductive pathways are on the topside of layers 21 and 41 so that in each case the respective resistance bars and conductive pathways are facing each other in spaced relationship.

In FIG. 2 a series of embossed insulative dots 6 (only a few shown) are formed on the bottom surface of layer 31 or on the top surface of layer 42 to normally space the facing layers from each other. The spacing and height of the insulating dots are such so as to permit movement of one layer towards the other layer, generally 31 against rigidly supported layer 41, so that a contact can be made between the interdigitated lines and between a series of four dots. The dots surround the area or point of contact of layers 31 and 41.

FIG. 3 illustrates in more detail the contacting of a two interdigitated conductive pathways of FIG. 2 leading from one resistive bar 32 to two interdigitated conductive pathways leading to another resistive bar 42. As illustrated, when the general area denoted by circled points 1-2-3-4 is pressed by the user's finger or stylus, point 2 bridges between pathways 34a and 45b while point 3 bridges between pathways 35b and 44a, resulting in an x-output from pathway 33 and a y-output from pathway 49.

In pressing a particular location or area on the layer 11 it is probable that one, two, or three or even possibly even four contacts will be made dependent on the bluntness of the finger or stylus end. The number of contacts does not affect the general resolution of the device and the device operates even though more than one contact is made on one pressing since part of the carbon bar is shorted from an edge of the touched area by the shown connection of lines 17 and 18. Each contact point 2, 3, 5 is surrounded by four equally or approximately equally displaced insulative dots. The insulator dots 6 on the tablet layer 31 may be either embossed on that surface or may be silk screened on the surface. The width and height of the insulated dots are approximately 20 mil by 1 mil. Thus, the two layers 31 and 41 are spaced approximately 1 mil apart. The insulation areas are represented by dots 1 and 4 in FIG. 3.

The structures explained with respect to FIGS. 1 and 2 above are set forth as equivalent circuits in FIGS. 4 and 5. In FIG. 4 a potentiometric reading is outputed from the pick offs 3 and 2 from resistive bars 32 and 42 respectively. These pick offs 2 and 3 represent, for example, the points 2 and 3 shown in FIG. 3.

In FIG. 4 the current in the sense circuit made up from the interdigitated lines and conductive lines is zero thus forming a voltage divider or potentiometer. Since $V=RI$ and $V_t=R_tI$ where $R_t$ is the resistance of the bar from a position opposite the touch point, i.e., the intersection of a touched pathway with the bar, to the grounded end of the bar, and $V_t$ is the voltage (0–5 V.) picked off opposite the touch point by the sense circuit then:

$$V_t = R_t(V/R)$$

and $$V_t/V = R_t/R$$

thus $$V_t = V(R_t/R)$$

In FIG. 5 the common reference voltage is omitted from the circuit so that the resistive bars 32 and 42 in effect measured in the rheostatic mode rather than a potentiometric mode. This permits the overall touch tablet to be used with paddle port inputs to computers with no multiplexing or analog-to-digital converter electronics for interfacing with that computer. A voltage input is connected to the appropriate paddle port input and indicates to the computer the particular x-axis and y-axis coordinates which have been touched on the touch tablet and which are to be reflected on the video screen. The FIG. 5 equivalent circuit is connected to a computer circuit which normally includes a capacitor. The combination of this capacitor and the particular resistances represented by inputs x and y gives an RC time constant which can be measured to give a digital readout. This determines what the resistance values are and the x and y coordinates of the point touched.

In FIG. 5 a current sense circuit is provided on the current-carrying pathways.

$V=(R_t+K)I_t$ where K is a constant resistance value and $I_t$ is the current flowing to the bar at a touch-point.

Solving for $I_t$ results in $I_t=V/(R_t+K)$

At the end of the bar 32 opposite a ground or reference potential $$V = R_{max} I_{min}$$

then $$R_t I_t = R_{max} I_{min}$$

and $$R_t/R_{max} = I_{min}/I_t$$

thus $$R_t = (I_{min}/I_t)R_{max}.$$

FIG. 6 illustrates an overall touch tablet which incorporates the two-layer structure described above. Touch tablet 50 includes an upper flexible insulative layer 51 corresponding to upper layer 11 and a lower fixed insulative layer 61 corresponding to layer 21. Layer 51 has a under surface 54 containing a resistive bar and interdigitated conductive pathways (not shown) facing a similar resistive bar and orthogonal parallel pathways (not shown) on surface 64 of layer 61. FIG. 6 represents one-half of a cross-sectional view of a rectangular or preferably square pad. The cross-sectional view is shown as being taken on any of the sides of the tablet 50. A peripheral ridge 56 is embossed 360° around the normally rectangular top sheet 51 to form a hinge-like embossment which spaces the operable central portions 59 of layer 51 from layer 61. The peripheral end 57 of layer 51 is staked around 360° by plastic stakes 58 to edge peripheral portions of layer 61. Layer 61 is a rigid insulative (PVC) printed circuit board. Layer 61 rests on a ridge 62 in a bottom casing portion 63 of the touch tablet 50. An upper casing or tablet frame 65 is attached to the lower casing 63 by adhesive or screws. A protective layer 66 of polycarbonate insulative plastic is attached to the underside of top frame 65 in abutment with the top insulative surface of layer 51. Staking of the edge portions 57 of layer 51 by stakes 58 tends to bulge top layer 51 slightly outwardly at its center portions 59. Upon pressing a point or limited area on central portion 59 or other portions within the sight of the inner periphery 65a of frame top 65 the underside 54 of layer 51 is pressed into contact with a point or limited area of the top surface 64 of layer 61. The central surface of layer 51 is hinged about the embossment 56 and upon removal of the finger or stylus pressing force the hinge returns layer 51 to its normal spaced position with respect to layer 61, thus keeping the surfaces 54 and 64 separated.

The above description of embodiments of this invention is intended to be illustrative and not limiting. Other embodiments of this invention will be obvious to those skilled in the art in view of the above disclosure.

I claim:

1. A multi-layer passive touch tablet comprising:
   a first insulative layer having a first resistive coated bar extending along a first edge of said layer and a first series of conductive spaced parallel pathways extending orthogonally from said bar across said layer;
   a conductive strip extending along a second edge of said layer opposed to said first edge and a second series of conductive spaced parallel pathways extending from said strip toward said bar and interdigitated with said first series of pathways;
   a second insulative layer normally spaced from said first layer, said second layer having a second resistive coated bar extending along a first edge of said second layer orthogonally opposite said first bar and a third series of conductive spaced parallel pathways extending from said second bar toward an opposed second edge of said second layer, wherein said third series of pathways are orthogonal with and facing said first and second series of pathways;

means for applying an electrical potential to a location on each of said bars, an end of each of said bars displaced from said location being connected to a reference potential;

means for simultaneously bringing a discrete area of said first and second series of pathways into contact with said third series of pathways when one of said layers is pressed by a force against the other layer; and means for simultaneously outputting voltage or resistance readings representative of a linear distribution of potential or resistance along each of said bars indicating x-axis and y-axis coordinates of the area pressed.

2. The tablet of claim 1 in which said third series of conductive pathways comprise a second conductive strip extending along an edge of said second layer opposite said second bar and interdigitated spaced parallel conductive strips alternatively extending from said second bar and said second strip toward said second strip and said second bar, respectively, to a position adjacent to and gapped therefrom.

3. The tablet of claim 1 further comprising multiple spaced insulating embossment means extending from one of said layers toward the other layer to normally space said layers from each other, and wherein said embossment means insulates intersections of said first and second series of conductive pathways with said third series of conductive pathways surrounding said discrete area brought into contact by said pressing.

4. The tablet of claim 1 further including an embossed peripheral edge portion on one of said layers facing the other of said layers to normally space said layers and to return said layers to a spaced position upon removal of the pressing force.

5. The tablet of claim 1 in which said third series of conductive pathways all extend from said second bar, are of high density and have free ends adjacent to and gapped from an edge of said second layer opposite said second bar.

6. The tablet of claim 1 in which said potential is connected to one end of each of said bars and the other end of said bars being connected to a reference potential, said x-axis and y-axis readings being outputted from said conductive strips on said first and second layers.

7. The tablet of claim 1 in which said potential is connected to one end of one of said bars on a layer and to a conductive strip on the other end of said layers.

* * * * *